United States Patent [19]

Vyas

[11] 4,243,983
[45] Jan. 6, 1981

[54] METHOD AND APPARATUS FOR DETECTING THE MULTIPLE FEEDING OF DOCUMENTS

[75] Inventor: Arvind C. Vyas, Waterloo, Canada

[73] Assignee: NCR Canada Ltd. - NCR Canada Ltee, Missisauga, Canada

[21] Appl. No.: 65,384

[22] Filed: Aug. 9, 1979

[51] Int. Cl.³ .......................... G08B 21/00; B65H 7/12
[52] U.S. Cl. .................................... 340/674; 209/569;
235/449; 271/258; 271/263; 340/146.3 C
[58] Field of Search ............... 271/258, 259, 263, 262;
209/534, 569; 340/146.3 C, 146.3 Z, 674, 675;
235/449, 475, 476; 250/223

[56] References Cited

U.S. PATENT DOCUMENTS

| | | | |
|---|---|---|---|
| 3,221,303 | 11/1965 | Bradley | 340/146.3 C |
| 3,629,822 | 12/1971 | Johnson | 340/146.3 C |
| 3,890,597 | 6/1975 | Hanchett | 340/146.3 Z |
| 4,031,402 | 6/1977 | Dlugos et al. | 250/223 X |

Primary Examiner—Bruce H. Stoner, Jr.
Attorney, Agent, or Firm—J. T. Cavender; Albert L. Sessler, Jr.; Elmer Wargo

[57] ABSTRACT

A method and apparatus for detecting a multiple-feed situation with regard to documents having encoding arranged thereon in a predetermined manner and with the documents being moved along a transport path. In a preferred embodiment of the invention, the documents are encoded with magnetic ink. A sensing member is positioned along the transport path in operative relationship with the encoding on the documents for generating a first signal in response to a character of the encoding being in moving relationship with the sensing means. A first circuit is used for receiving the first signal and for generating a first time frame. A second circuit is used for generating a second time frame beginning upon the expiration of the first time frame; and a third circuit is used for generating an output signal indicative of a multiple-feed situation when a subsequent signal from the sensing means occurs during the second time frame.

16 Claims, 12 Drawing Figures

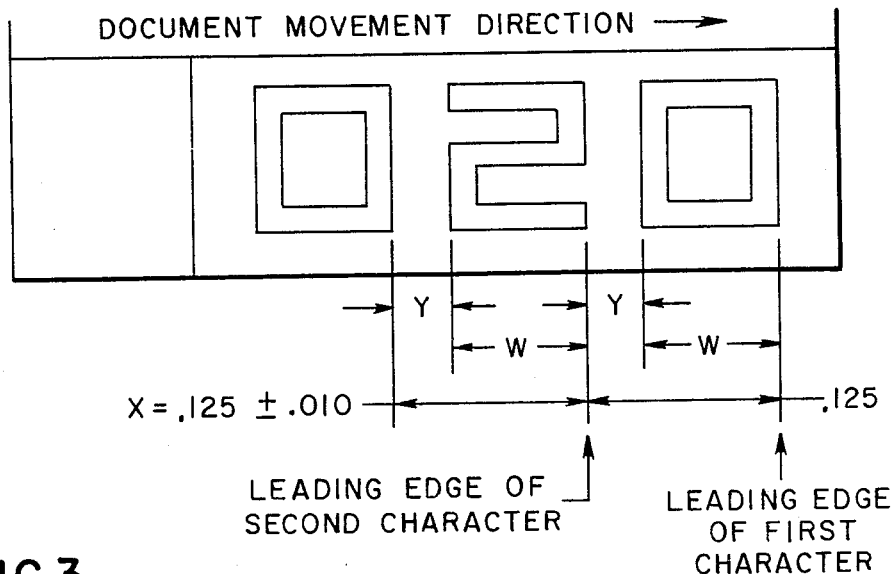
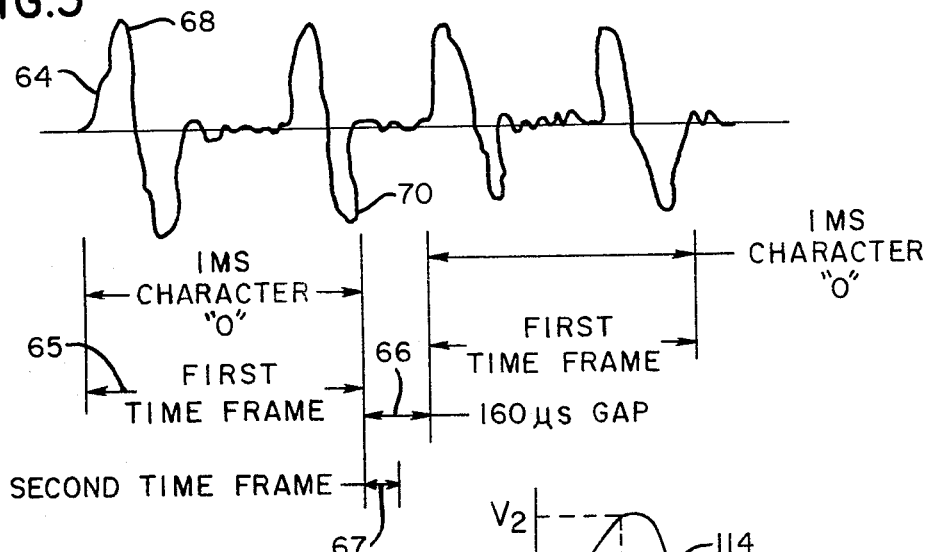
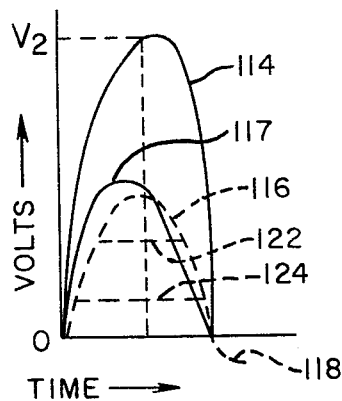

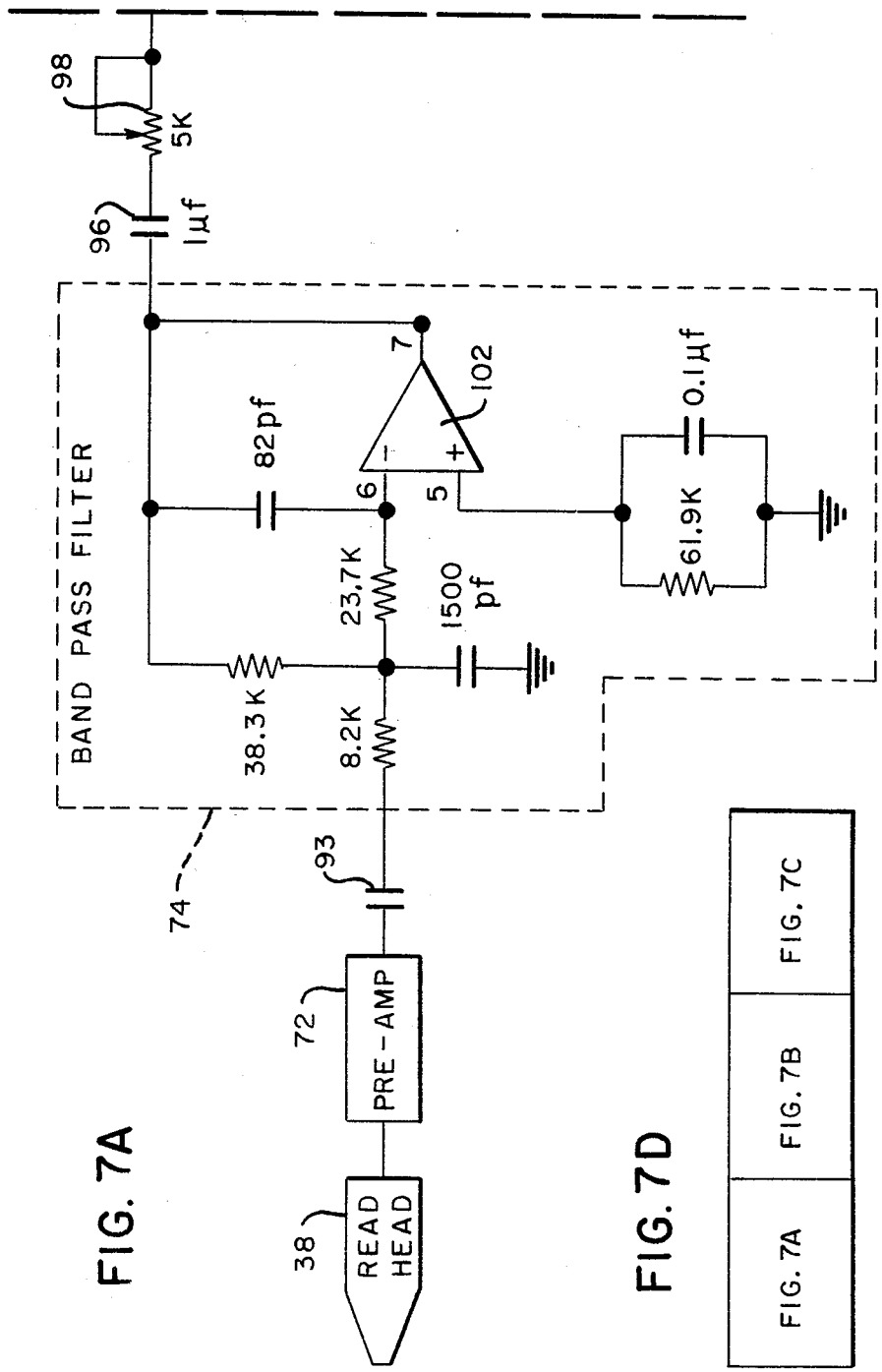

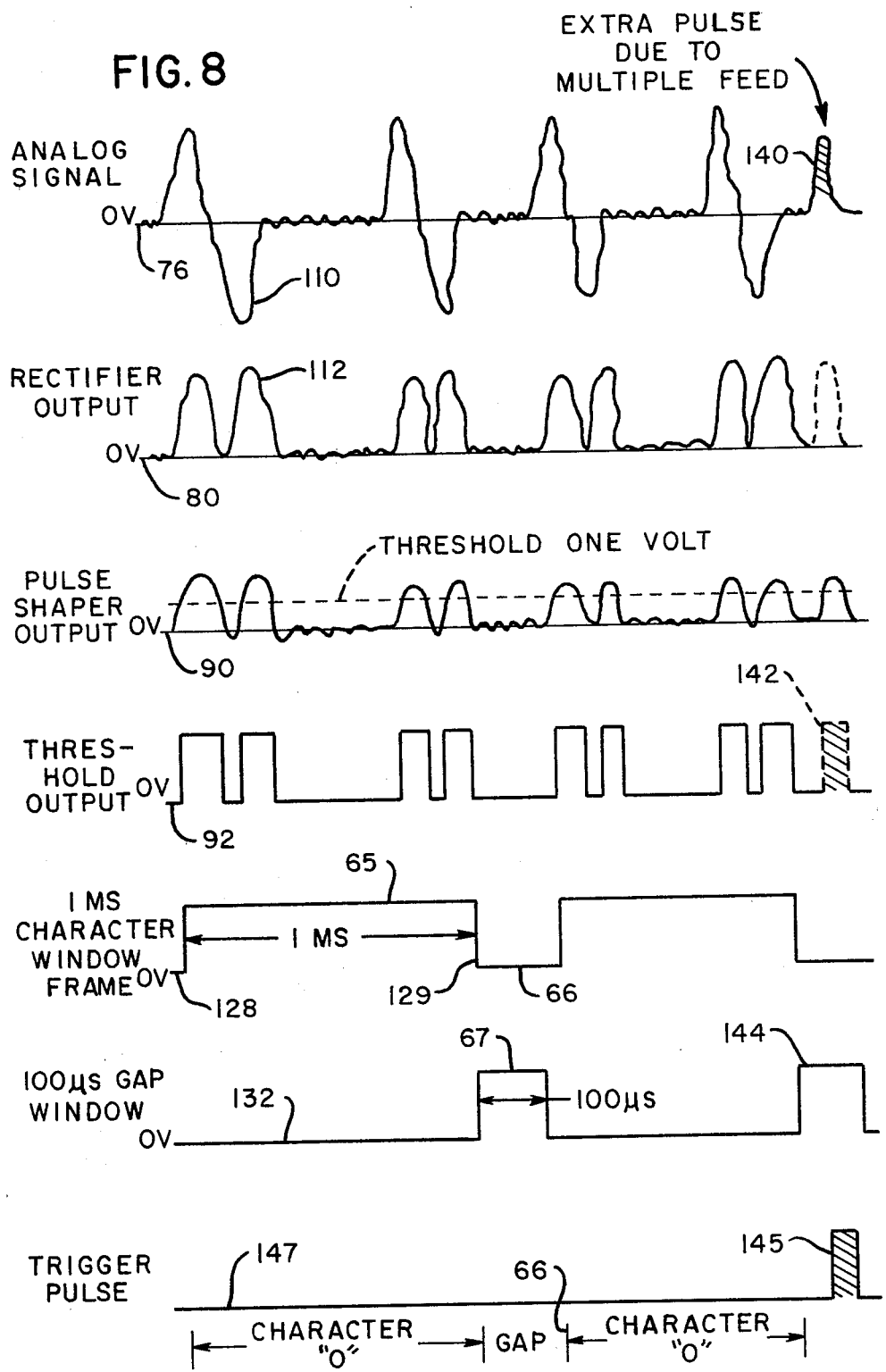

4,243,983

METHOD AND APPARATUS FOR DETECTING THE MULTIPLE FEEDING OF DOCUMENTS

BACKGROUND OF THE INVENTION

This invention relates to a method and apparatus for detecting multiple-feed situations with regard to documents being fed along a transport path, and more particularly, it relates to detecting multiple-feed situations relating to documents having MICR (Magnetic Ink Character Recognition) encoding thereon.

One of the problems associated with prior art, multiple-feed detection systems with regard to the feeding of documents along a transport path is that some of these systems are not able to detect multiple-feed situations in all kinds of overlapping situations of the documents. For example, some systems which attempt to detect multiple-feed situations by measuring the "length" of a document and comparing it with a standard expected length, may miss a multiple-feed situation in which two documents, which are shorter than the expected length, are in slightly overlapping relationship so as to be interpreted by the system as being the expected length or a single document.

Other prior art, multiple-feed detection systems which rely on photo sensors, for example, to detect double thicknesses of documents by light passing through both documents do not operate well when the documents have colors of different color densities thereon.

SUMMARY OF THE INVENTION

This invention relates to a method and apparatus for detecting a multiple-feed situation with regard to documents having encoding arranged thereon in a predetermined manner and with the documents being moved along a transport path. In a preferred embodiment of the invention, the documents are encoded with magnetic ink.

A sensing means is positioned along the transport path in operative relationship with the encoding on the documents for generating a first signal in response to a character of the encoding being in moving relationship with the sensing means. A first circuit means is used for receiving the first signal and for generating a first time frame. A second circuit means is used for generating a second time frame beginning upon the expiration of the first time frame, and a third circuit means is used for generating an output signal indicative of a multiple-feed situation when a subsequent signal from the sensing means occurs during the second time frame.

The apparatus of this invention is economical to produce and is able to detect multiple-feed situations with regard to documents having an ink intensity which varies from 40% to 300% of the standard ink intensity (which is considered 100%) for a particular magnetic ink character recognition (MICR) encoding, for example. The apparatus is also able to detect MICR encoded documents which are accidentally placed upside down while being fed along the transport path.

These advantages and others, will become more readily understandable in connection with the following specification, claims, and drawing.

BRIEF DESCRIPTION OF THE DRAWING

FIG. 2 is a diagrammatic view of certain characters, showing the spacing of the characters in one standard encoding, namely, a MICR encoding used by the U.S. banking industry;

FIG. 3 is a diagrammatic view of a waveform representing certain characters separated by a window gap which is examined to detect multiple documents being fed by the apparatus shown in FIG. 1;

FIGS. 7A, 7B, and 7C taken together, show more details of the circuit shown in FIG. 6;

FIG. 7D is a layout showing how FIGS. 7A, 7B, and 7C should be arranged to form the associated composite drawing;

FIG. 8 shows various waveshapes and timing signals associated with the multiple feed detection circuit shown in FIGS. 1, 6, 7A, 7B and 7C; and FIG. 9 shows various waveforms associated with the amplifier-shaper circuit shown in FIG. 7B.

DETAILED DESCRIPTION OF THE INVENTION

Figure 1:
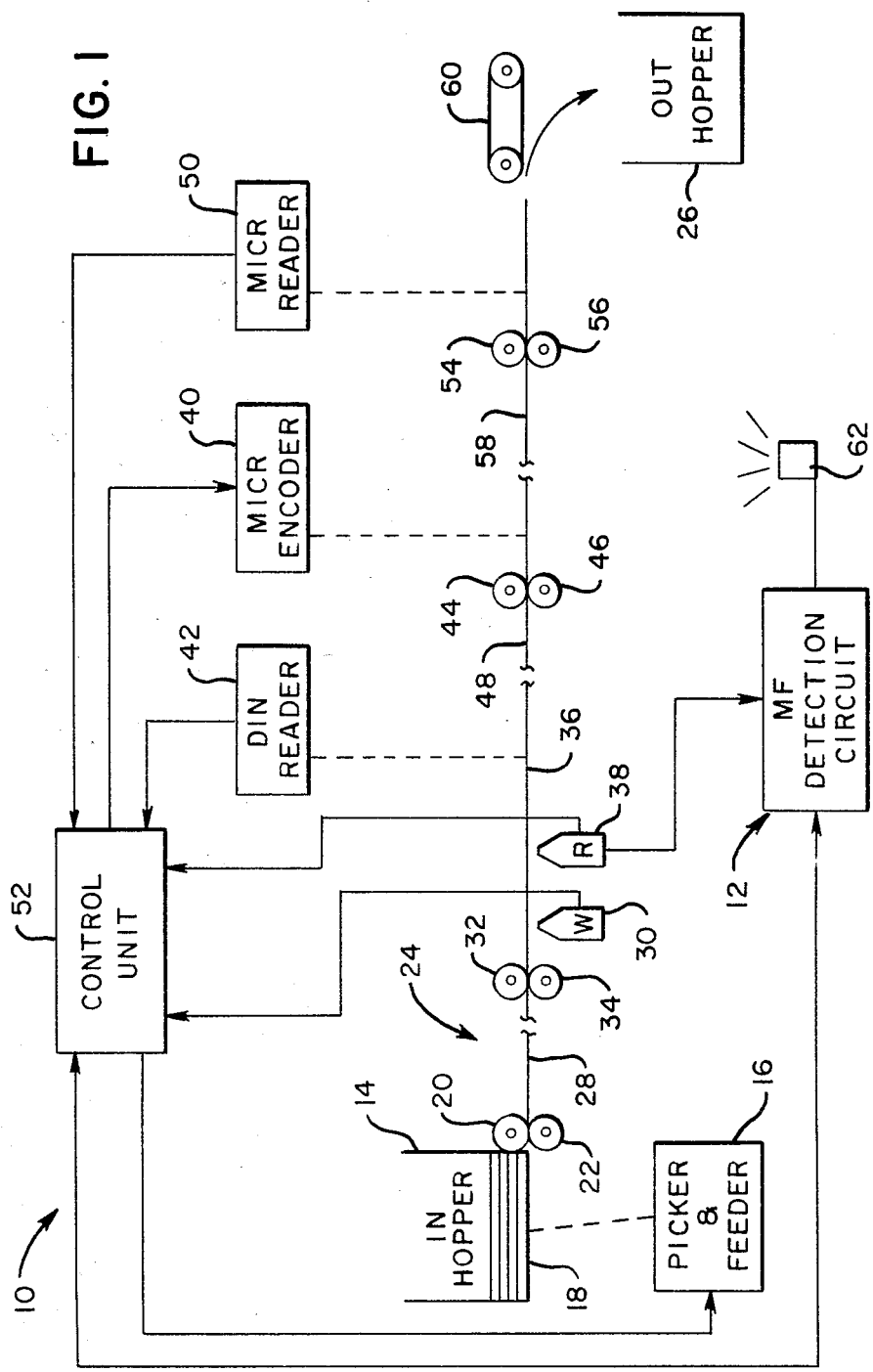
FIG. 1 is a general schematic diagram, in block form, showing an apparatus in which this invention may be used.

FIG. 1 is a general schematic diagram, in block form, of an apparatus designated generally as 10, with which a multiple feed detection circuit (hereinafter referred to as MFD circuit 12) of this invention may be used.

The apparatus 10 (FIG. 1) is a part of a banking system which utilizes a document identification number (hereinafter called DIN) which is printed on each of certain documents, such as checks or deposit slips, for the processing of such documents which are entered into the banking system.

Under ideal conditions, the documents or checks are fed into the apparatus 10 singly or one at a time; however, at certain times, two or more checks are improperly fed at the same time creating a multiple-feed situation which must be detected before further processing of the checks can be properly effected. If the multiple-feed situation is not detected, MICR encoded data may be improperly applied to a check, for example. The MFD circuit 12 coacts with the apparatus 10 for the purpose of detecting such multiple-feed situations.

Before proceeding with a detailed discussion of the MFD circuit 10, it appears appropriate to discuss, in a general way, the functioning of the apparatus 10.

The apparatus 10 (FIG. 1) includes an "in hopper" 14 in which the documents or checks are stored on edge. A conventional picker and feeder apparatus 16 is utilized to pick the next check 18 from the hopper 14 and to move it to a pair of feed wheels 20 and 22 which move the check along a transport path shown generally as 24. As viewed in FIG. 1, a check 18 is moved in a vertical plane (perpendicular to the plane of FIG. 1) along the transport path 24 so that its top most edge appears as a line along the path 24, although other orientations may be used. The transport path 24 is shown as being discontinuous in FIG. 1 only to point out that a check is moved at different speeds along different portions of the length thereof; however, each check is moved along the transport path 24 from the in hopper 14 to the out pocket or hopper 26 where the processed checks are collected.

In the apparatus 10 being described, a check 18 is moved at a first velocity of 34.6 inches per second along the first portion 28 of the transport path 24. Naturally, the velocities and locations of various elements (positioned along the transport path 24) to be described later herein are dependent upon the specific parameters of a specific application of this invention; however, some specific velocities and displacement locations will be given for a specific embodiment of this invention.

The apparatus 10 (FIG. 1) also includes a magnetic write head 30 which is located at a distance of at least 9 inches from the centers of the feed wheels 20, 22. The picker and feeder mechanism 16 and the feed wheels 20 and 22 intermittently feed a check 18 to the feed wheels 32 and 34 which feed or move the check at a constant velocity of 104 inches/second along a second portion 36 of the transport path 24. A read head 38 is displaced or located downstream from the write head 30 and adjacent thereto. In the embodiment being described, the longest check 18 anticipated is 9 inches long; therefore, the trailing edge of the check 18 will be free of the rollers 20 and 22 when it is fed past the write head 30 and the adjacent read head 38 along the second portion 36 of the transport path by the feed rollers 32 and 34.

The output of the read head 38 is fed into the MFD circuit 12 to detect the presence of a multiple-feed situation mentioned earlier herein; the read head 38 is located sufficiently upstream along the transport path 24 so as to enable the detection of multiple documents being fed prior to the encoding of MICR characters or symbols on the check by a MICR encoder 40. A DIN reader 42 is located in reading relationship with the documents or checks being moved along the transport path 24. The DIN reader 42 reads the DIN on a check and forwards it to a conventional control unit 52 which in turn forwards certain associated data (such as monetary amount) about that particular check to the MICR encoder 40. The MICR encoder 40 includes a conventional printer which prints the MICR encoded data on the check 18. Another set of feed wheels 44 and 46 is utilized to drive the checks at a velocity of 2 inches per second along a third portion 48 of the transport path 24 to provide a necessary slow speed to effect printing on the check while it is moving in operative relationship with the MICR encoder 40. A conventional MICR reader 50 is utilized to read the MICR data just printed on the checks and to output this data (for verification) to the control unit 52 which may include a processor and associated programs for controlling the sequences and operations of the apparatus 10. Because the functioning of the control unit 52 may be conventional, and this functioning is not necessary for an understanding of this invention, it need not be described in any further detail. A set of feed wheels 54 and 56 is utilized to drive the checks at a velocity of 104 inches per second along a fourth portion 58 of the transport path 24 while the checks are in reading relationship with the MICR reader 50. After the checks are read by the MICR reader 50, they are moved into the out hopper 26 by a conventional feed belt 60.

Whenever two or more overlapping documents or checks, such as 18, are detected by the MFD circuit 12 (FIG. 1), a visual indication (as by a light emitting diode, (LED) 62) is given by the circuit 12 to inform the operator of the apparatus 10 of this multiple-feed situation. Optionally, the output of the MFD circuit 12 may also be fed to the control unit 52 to stop the movement of checks along the feed path 24 and to also indicate to the operator of the apparatus 10 that the last two checks, for example, in the out hopper 26 resulted from a multiple-feed situation. In a multiple-feed situation, the MICR encoder 40 (also under the control of the control unit 52) would be precluded from encoding the associated checks.

Before proceeding with a detailed discussion of the MFD circuit 12, it would appear appropriate to discuss the physical parameters of the MICR characters on the check and how they relate to the physical parameters of the apparatus 10.

FIG. 2 shows an enlarged view of one set of MICR characters as they appear near the bottom of a check 18. The characters shown conform to the American Bankers Association (ABA) codes or specifications entitled E-13B although the principles of this invention may be extended to other encodings. Under these codes, the distance between identical points of characters (such as leading edges) is a constant distance which is equal to 0.125 inches±0.010 inch in the embodiment being described. The width (W) of the individual characters and symbols under these codes ranges from a minimum of 0.052 inch for the character one to a maximum of 0.091 inch for the various "amount" and "transit" symbols used in the codes. With the tolerances given, the distance X can never be less than 0.115 inch. Because the nominal width (W) of the characters varies from character to character, the spacing (Y) between adjacent characters will also vary. Using a track speed or velocity of 104 inches per second for the second portion 36 of the transport path 24 (FIG. 1) it was observed that each MICR character would exhibit a pulse width of no longer than about 1 millisecond when read by the read head 38, for example, and the space Y (FIG. 2) between two adjacent characters would correspond to a minimum of about 100 microseconds, with the maximum time for travelling over space Y being about 200 microseconds between successive adjacent narrow characters.

With the above in mind, FIG. 3 shows a waveform which results when the magnetic ink in the MICR characters (for two successive zeros, for example, on a check 18) coacts with the read head 38 (FIG. 1). The read head 38 is conventional and employs the write head 30 to magnetize the magnetic ink in the MICR characters on the check 18 prior to the read head 38 generating the waveforms such as those shown in FIG. 3. The waveform (FIG. 3) always starts out in a positive direction for the beginning of a character, as for example segment 64; this is a characteristic of the encoding employed. Using the physical dimensions of the characters discussed in relation to FIG. 2 and the physical dimensions of the apparatus 10 (FIG. 1), the character zero or "0" would have its entire waveform occurring in a first time frame 65 having a duration of one millisecond followed by a gap 66 of 160 microseconds; a second character zero, of one millisecond duration (another first time frame) follows the gap 66 as shown. Under the present invention, when a single document or check 18 is fed past the read head 38, no signal is detected in a window or a second time frame 67 immediately following the termination of the first time frame 65. In the embodiment being described, the second time frame 67 has a minimum duration of 100 microseconds and occurs within the gap 66. As previously stated, the window or gap 66 in FIG. 3 can vary from a minimum of 100 microseconds to a maximum of 200 microseconds depending upon which successive characters the gap is between. Under the MICR coding, a character such as the zero shown in FIG. 3 is made up of eight segments with the peak 68 being in the first segment and the negative peak 70 being in the eighth segment from a character recognition standpoint; however, because the character recognition aspects of the MICR coding are not important to this invention, they need not be discussed in any further detail.

Whenever a multiple-feed situation is encountered by two or more checks 18 being fed together in the apparatus 10, the MICR characters on the checks will produce extra pulses (to be later shown herein) which occur in the second time frame 67 in the waveform shown in FIG. 3.

The MFD circuit 12 was designed to detect extra pulses which occur in the second time frame 67 (FIG. 3) caused by overlapping MICR characters which result from a multiple-feed situation of two or more checks being fed on the transport path 24. Basically, each character (such as the zero in FIG. 3) is framed by a time interval of one millisecond, which interval is triggered by a positive rising edge of the waveform of that character, i.e., the first peak (like 64 in FIG. 3) or portion of the waveform associated with a character is always positive and always is present in the first of the eight segments which are associated with the character for character recognition purposes. The trailing edge of each character is correspondingly generally negative, although this aspect is not necessary for this invention. The time interval of one millisecond is then followed by the second time frame 67 or a time-out of 100 microseconds; any pulses which are detected by the MFD circuit 12 during the second time frame 67 of 100 microseconds are assumed to represent a multiple-feed situation.

Figure 6:
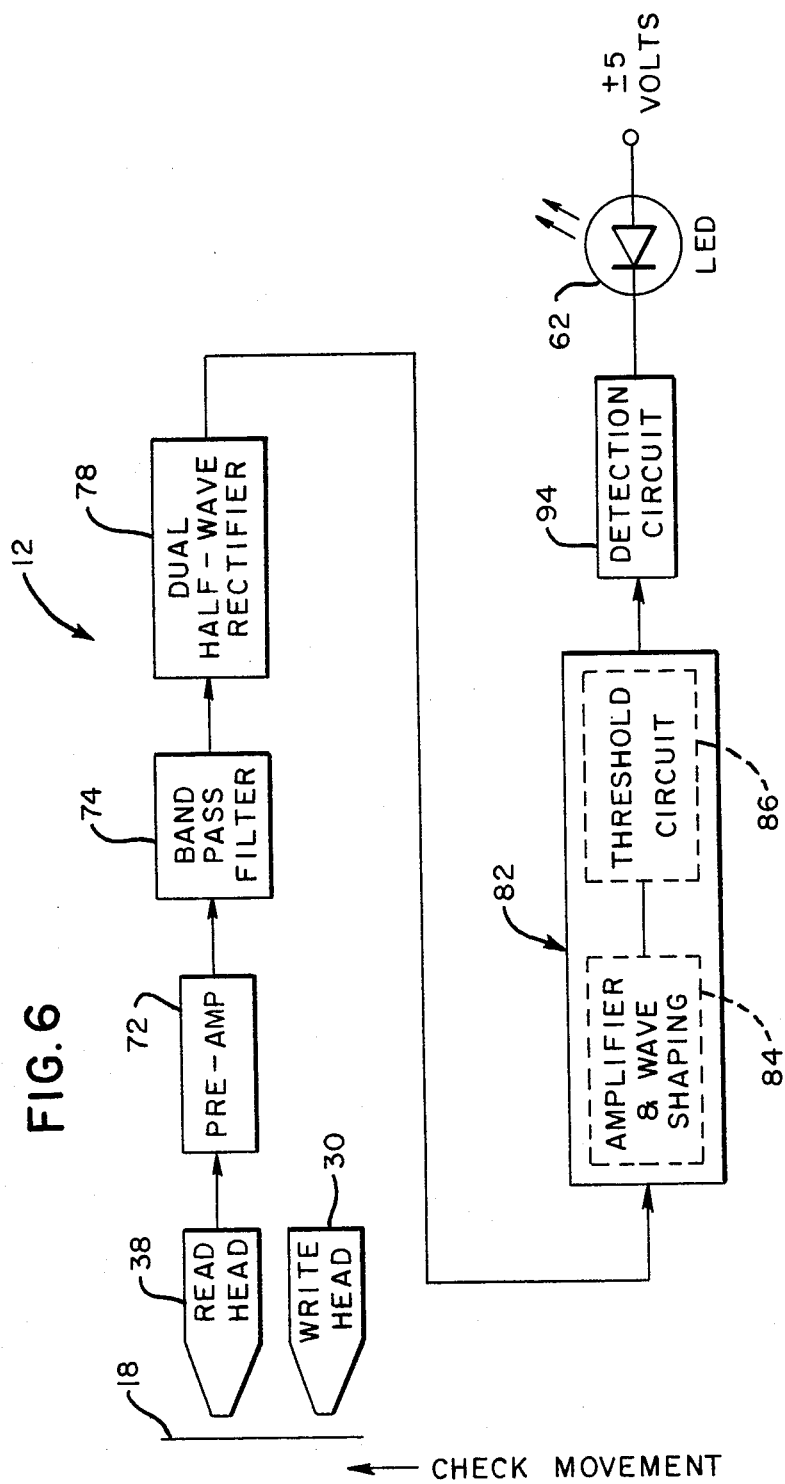
FIG. 6 is a schematic diagram, in block form of the multiple-feed detection circuit shown in FIG. 1.

FIG. 6 shows a general schematic diagram in block form of the MFD circuit 12 shown in FIG. 1. As a check passes the read head 38, it produces waveshapes or analog signals of the type shown in FIG. 3; these signals are approximately 3 to 5 millivolts (peak to peak) and are fed into a conventional preamplifier 72. The amplitude of the signals from the read head 38 is proportional to the flux intensity of the magnetic field associated with MICR characters. In other words, the MICR characters are specified to be printed on a document with a particular ink intensity; this is referred to as the standard or 100%. If documents are printed with an ink intensity of 50% compared to the standard, the resulting flux intensity of the MICR characters when read will produce an analog signal whose amplitude is correspondingly less than the amplitude of an analog signal resulting from reading MICR characters which are printed according to the standard. The MFD circuit 12 can detect a multiple-feed situation resulting from checks having an ink intensity of from 40% to 300% with respect to the standard of 100%. The signals from the read head 38 are amplified in the pre-amp 72 by an amplification factor of approximately 190, and the amplified output therefrom is fed into a conventional bandpass filter 74 which basically eliminates noise spikes from the signals and also amplifies the signals by an amplification factor of approximately 3.9. The output of the filter 74 is shown on line 76 in FIG. 8, and this output is fed into a conventional dual, half-wave rectifier 78 (FIG. 6) whose output is shown on line 80 in FIG. 8. The function of the rectifier 78 is to produce unidirectional signals or to rectify the analog signal and to amplify it by an amplification factor of approximately 3.4.

The output from the rectifier 78 (FIG. 6) is fed into a signal conditioning circuit designated generally as 82 whose function is to amplify and shape the output from the rectifier 78 so that multiple-feed situations involving documents having an ink intensity which is 40% of standard can be detected and documents having an ink intensity which is 300% of standard will not cause false triggering of the MFD circuit 12. The conditioning circuit 82 includes an amplifier and wave shaping circuit 84 and a threshold circuit 86. The output of the amplifier and wave shaping circuit 84 is shown on line 90 of FIG. 8, and the output of the threshold circuit 86 is shown on line 92 of FIG. 8. The output of the threshold circuit 86 is fed into a detection circuit 94 whose output illuminates the LED 62 whenever a multiple-feed situation is encountered.

Figure 7B:
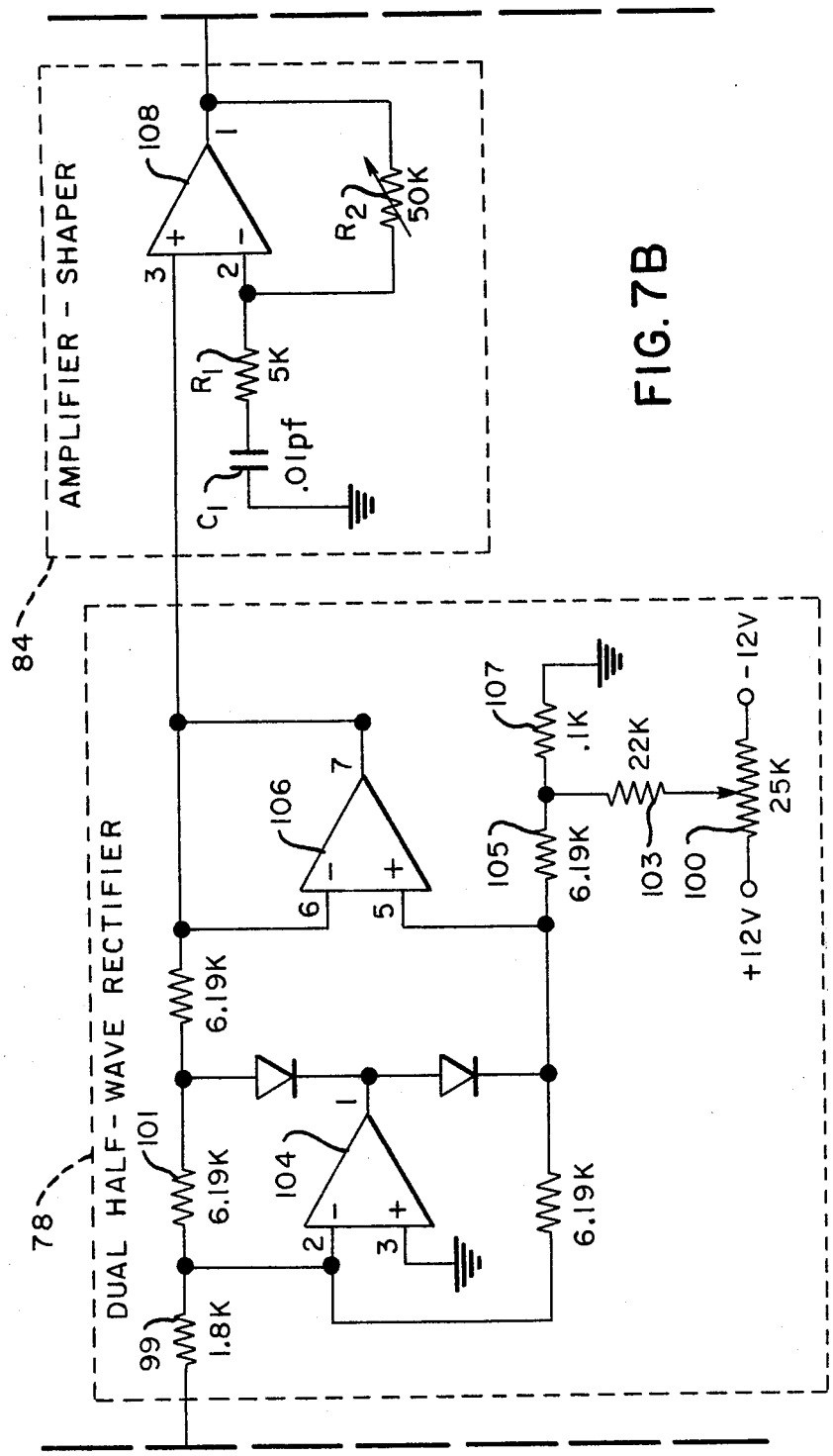
Figure 7C:
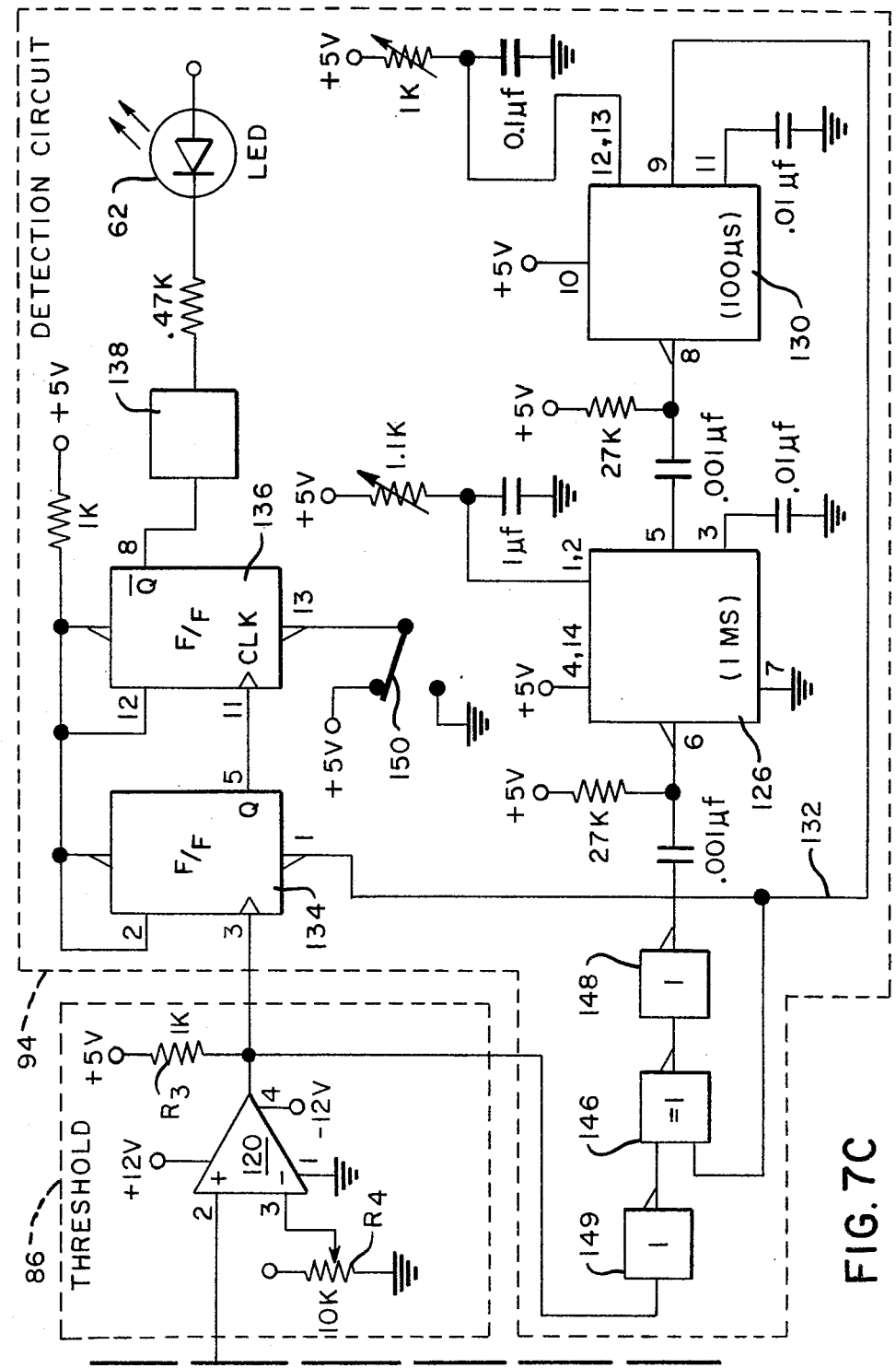

FIGS. 7A, 7B, and 7C taken together (as shown in FIG. 7D) show more details of the MFD circuit 12 shown in FIGS. 1 and 6. FIGS. 7A and 7B show more details of the bandpass filter circuit 74 and the rectifier circuit 78, with representative values being given on the figures for the various components included therein; because these circuits 74 and 78 are conventional, they need not be described in any further detail. The capacitor 93 (FIG. 7A) between the pre-amp 72 and the bandpass filter circuit 74 is there for the purpose of providing a noise free coupling between these two circuits. The capacitor 96 provides for an AC coupling between the circuits 74 and 78, and the variable resistor 98 in conjunction with resistors 99 and 101 (FIG. 7B) controls the amplification factor of approximately 3.4 for the rectifier circuit 78. The variable resistor 100 and the resistors 103, 105, and 107 are used in the circuit 78 as a compensation network for the modules 104 and 106 included therein. The modules 102, 104, and 106 are conventional operational amplifiers such as #LM 1458 which are manufactured by Motorola, for example.

The output of the rectifier circuit 78 (FIG. 7B) is fed into the positive input terminal (#3) of a conventional operational amplifier 108 included in the amplifier shaper circuit 84 shown in FIG. 7B. When comparing the rectifier output, (line 80 in FIG. 8) with the corresponding analog signal on line 76, it can be seen that the negative going pulses, like 110, are converted to positive analog pulses, like 112. The function of the amplifier shaper circuit 84 is to convert the rectified output (line 80, FIG. 8) into square waves which can be used in the MFD circuit 12. The amplification factor achieved by the circuit 84 is approximately 14.

One of the problems associated with handling checks having MICR characters thereon is that ink intensity can vary greatly from 40% to 300% of the standard used which standard is considered 100% as previously stated; this means that the associated analog signals received by the read head 38 can vary greatly. To compensate for this fact, the circuit 84 (FIG. 7B) has a capacitor $C_1$, in series with resistor $R_1$, whose one end is normally grounded in other circuits. Without the capacitor $C_1$ in the circuit but with the resistors $R_1$ and $R_2$ therein, the output of the circuit 84 (like 114 in FIG. 9)

has an amplification factor determined by $1+R_1/R_2$. When capacitor $C_1$ is added to the feedback circuit of circuit 84, the following happens. As the input signal to the op amp 108 starts to rise, the output thereof also starts to rise, but with a slight delay due to the fact that the capacitor $C_1$ starts charging slowly; this factor provides the gain-controlling feature of circuit 84. Before the capacitor $C_1$ can charge up to the voltage level of $V_2$ in FIG. 9, the output of the op amp 108 starts reducing towards zero; therefore the output of the op amp 108 never can reach $V_2$, thereby controlling the gain of circuit 84 as represented by dashed line 116 in FIG. 9. Line 117 in FIG. 9 represents the input signal to terminal #3 of the op amp 108. When the output (116) of the op amp 108 reaches zero volts, there is still a charge on the capacitor $C_1$ and also due to the response time of the op amp 108, there will be a negative-going portion 118 at the output of the op amp 108. This negative portion 118 does not affect the operation of the circuit 84; however, this aspect was compensated for in the threshold circuit 86 by supplying the operational amplifier 120 (FIG. 7C) with +12 volts and −12 volts, and by having the output thereof pulled up to +5 volts by the resistor $R_3$. The amplifier-shaper circuit 84 may be considered as being an automatic-gain-control circuit.

The output of the amplifier-shaper circuit 84 (FIG. 7B) is fed into the threshold circuit 86 (FIG. 7C) which is conventional except for the factor mentioned in the previous paragraph. The variable resistor $R_4$ is used for selecting a threshold level at which the waveform should be chopped to convert in into a square wave. The various terminal numbers for the integrated circuit modules like 102 and 108, for example, are shown on the associated FIGS. 7A–7C. The output from the threshold circuit is shown on line 92 of FIG. 8. By setting the threshold values at different voltage levels (via the resistor $R_4$) represented by lines 122 and 124 in FIG. 9, for example, it can be seen that the lower threshold value represented by line 124 would start the first time frame 65 (FIG. 3) sooner than the higher threshold value represented by line 122. If the higher threshold value (122) were selected, it is conceivable that the associated later starting first time frame 65 (FIG. 3) of 1 ms. would cause the second time frame 67 to be shifted to the right, as viewed in FIG. 3, to the point where the second time frame 67 would not be positioned in the gap 66 between adjacent characters but would be positioned at the start of the next succeeding character, and consequently, a multiple-feed situation might be missed or an erroneous indication might be given. In other words, the time durations of the first time frame 65 followed by the second time frame 67 would remain the same as shown on line 128 in FIG. 8, but they would be shifted to the right from the position shown therein. In the embodiment described, a threshold level of 1 volt (line 90 in FIG. 8) was selected after some experimentation with the range of ink intensities discussed earlier herein.

The output of the threshold circuit 86 (FIG. 7C) is fed into the detection circuit 94. It should be recalled that the leading edge 64 (FIG. 3) of a character is always positive; this feature is used to trigger a one-shot module 126 which has been conventionally wired to produce a one millisecond time frame 65 as shown on line 128 (FIG. 8) for the embodiment being described. After the expiration of 1 millisecond, the fall of the signal (as at 129) is used to trigger the one-shot module 130 which has been conventionally wired to produce a 100 microsecond time frame 67 as shown on line 132 of FIG. 8, which time frame 67 occurs during the gap 66 shown in FIG. 3. The output of the one-shot 130 is fed over line 132 (FIG. 7C) to the enabling input (#1) of a conventional "D" type flip-flop 134. Any signal (which is positive-going) coming from the threshold circuit 86 will clock in a positive-going pulse at the Q output of flip-flop 134 (when the enabling input #1 thereto is at a high level), and this positive output from the Q output is used to produce a negative output at the $\overline{Q}$ output of flip-flop 136. The negative output from the flip-flop 136 is fed into a conventional driver 138 which is used to turn on the LED 62 which gives an indication that a multiple-feed situation has been detected. The extra pulse 140 shown on line 76 of FIG. 8, which is due to a multiple-feed situation, produces the pulse 142 on line 92 and also produces the trigger pulse 145 which occurs within the second time frame 144 (identical to time frame 67) which has a time duration of 100 microseconds in the embodiment described. The trigger pulse 145 on line 147 of FIG. 8 represents the Q output of flip-flop 134.

The output (positive) from the one-shot 130 is also fed into one input of the Exclusive Or gate 146. With one input to gate 146 being positive, the output thereof will always be negative regardless of what level is at the other input thereto. The negative output from the gate 146 is inverted by the inverter 148 to prevent the one-shots 126 and 130 from being triggered again during the 100 microsecond gap like 144 in FIG. 8. A single-pole, double-throw switch 150 (when connected to ground or zero volts) is used to reset the flip-flop 136 to turn off the LED 62 after a multiple-feed situation is detected. In normal operation, the switch 150 is connected to the +5 volt terminal. An inverter 149, connected between the output of the threshold circuit 86 and one input to the Exclusive Or gate 146, places the signal into the proper polarity to trigger the one-shot 126 as previously described. The one-shots 126 and 130 are conventional, such as the modules NE 556 which are dual timers which are used as one shots and which are manufactured by National Semiconductor, and Texas Instruments, for example. The values of the resistors and capacitors surrounding the one-shots 126 and 130 are shown in FIG. 7C and are conventionally selected to produce the outputs previously described.

Figure 4:
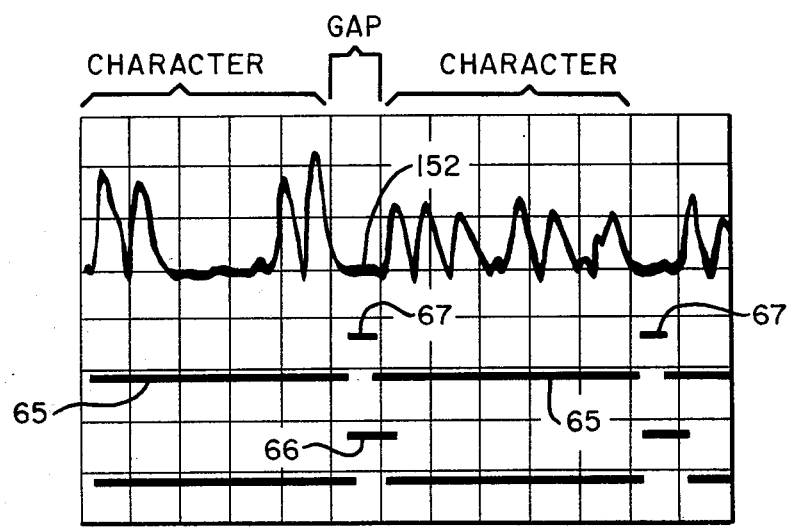
FIG. 4 is a diagram of a waveform which results from a single document being processed by the apparatus shown in FIG. 1, showing no pulses within the gap between adjacent characters.
Figure 5:
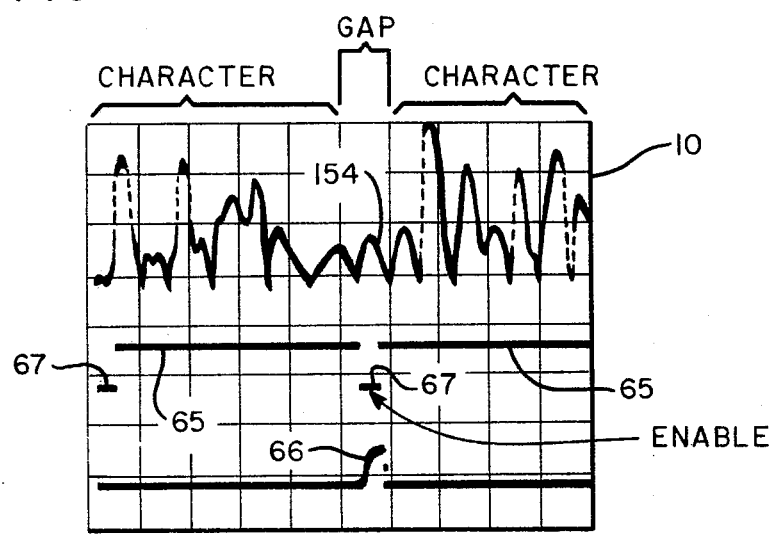
FIG. 5 is a diagram of a waveform which results from a multiple-feed situation being processed by the apparatus shown in FIG. 1, showing a pulse within the gap between adjacent characters.

FIG. 4 shows an oscilloscope trace of the rectified output (like line 80 of FIG. 8) of two successive characters for a single check 18 being fed along the transport path 24, with the first time frames 65, the gap 66 between adjacent characters and the second time frames 67 being shown thereon. Because this trace represents a single feed situation, not pulse is shown in the area 152 corresponding to the second time frame 67. FIG. 5 shows an oscilloscope trace similar to FIG. 4; however a pulse 154 is shown within the second frame 67, thereby indicating the presence of a multiple-feed situation.

Another feature of this invention is that if one of the checks such as 18 is improperly oriented (such as being upside down) within the stack or checks fed into the in hopper 14, a multiple-feed situation will be indicated by the apparatus 10. This is due to the fact that generally all the printing on a check (such as name of bank, "pay to the order of", etc.) is printed in magnetic ink along with the account number, etc. When a check is upside down, the general printing on the check (such as the name of the bank, etc.) will be read by the read head 38 causing the multiple-feed situation shown in FIG. 5 due to the fact that this general printing is not printed in the constraints that are employed in printing the MICR encoded data which is used for multiple-feed detection herein.

What is claimed is:

1. An apparatus for detecting a multiple-feed situation with regard to documents having encoding arranged thereon in a predetermined manner and with said documents being moved along a transport path, comprising:
sensing means positioned along said transport path in operative relationship with said encoding on said documents for generating a first signal in response to a character of said encoding which is in moving relationship with said sensing means;
first circuit means for receiving said signal and also for generating a first time frame;
second circuit means for generating a second time frame beginning upon the expiration of said first time frame; and
third circuit means for generating an output signal indicative of a said multiple-feed situation when a subsequent signal from said sensing means occurs during said second time frame.

2. The apparatus as claimed in claim 1 in which said first circuit means generates said first time frame to correspond to the maximum time that a character of said encoding is in moving relationship with said sensing means.

3. The apparatus as claimed in claim 2 in which said second circuit means generates said second time frame to correspond to the minimum elapsed time occurring between two adjacent characters of said encoding when they are in moving relationship with said sensing means.

4. The apparatus as claimed in claim 3 in which said encoding is effected in magnetic ink and said sensing means is magnetically operated to coact with said encoding.

5. The apparatus as claimed in claim 4 in which said first circuit means includes a rectifier circuit for converting said first and subsequent signals into unidirectional signals.

6. The apparatus as claimed in claim 5 in which said first circuit means further includes an amplifier and shaper circuit including an operational amplifier, with said unidirectional signals from said rectifier circuit being fed into the positive input of said operational amplifier and said amplifier and shaper circuit further including a capacitor and a resistor which are series connected between the negative input to said operational amplifier and ground to enable said amplifier and shaper circuit to function as an automatic-gain-control circuit.

7. The apparatus as claimed in claim 6 in which said first circuit means also includes a thresholding circuit having an input and an output thereto and also includes a timing circuit, with the input of said thresholding circuit being coupled to the output of said operational amplifier and with said output of said thresholding circuit being coupled to the input of said timing circuit which generates said first time frame.

8. The apparatus as claimed in claim 7 in which said third circuit means includes a detector circuit having an input thereto which is coupled to the output of said thresholding circuit and said second circuit means has an output which enables said detector circuit to generate said output signal when a signal from the output of said thresholding circuit occurs during said second time frame.

9. The circuit as claimed in claim 8 in which said second circuit means includes a second timing circuit having an input thereto and also having an output which comprises said output of said second circuit means,
said first circuit means also including a disabling circuit to prevent said first named timing circuit and said second timing circuit from being triggered during said second time frame.

10. The circuit as claimed in claim 9 in which said disabling circuit includes an Exclusive Or gate having first and second inputs thereto and an output therefrom, with one of said first inputs being coupled to the output of said second timing circuit and the second input thereto being coupled to the output of said thresholding circuit, and with the output of said disabling circuit being coupled to the input of said first named timing circuit.

11. The circuit as claimed in claim 10 in which said encoding is effected in MICR E-13B font.

12. The apparatus as claimed in claim 3 in which said encoding is effected in magnetic ink and said sensing means is magnetically operated to coact with said encoding.

13. A method for detecting a multiple-feed situation with regard to documents being moved along a transport path, said documents having encoding arranged thereon in a predetermined manner with adjacent characters thereof having a spacing therebetween; said method comprising the steps of:
(a) generating a first signal in response to a character of said encoding as a said document is moved in operative relationship with a means for sensing said encoding;
(b) generating a first time frame in response to said first signal, with said first time frame bearing a relationship to the times that characters of said encoding are in operative relationship with said sensing means;
(c) generating a second time frame beginning upon the completion of said first time frame, with said second time frame bearing a relationship to the times that the spaces between adjacent characters of said encoding are in operative relationship with said sensing means;
(d) generating an output signal indicative of a said multiple-feed situation when a subsequent signal from said sensing means occurs during said second time frame.

14. The method as claimed in claim 13 in which said step (a) is effected by utilizing a magnetically operated sensing means and also by utilizing a magnetic ink in said encoding.

15. The method as claimed in claim 14 in which said step (b) is effected by generating said first time frame to correspond to the maximum time that any one of the characters of said encoding is in operative relationship with said sensing means.

16. The method as claimed in claim 15 in which said step (c) is effected by generating said second time frame to correspond to the minimum time that any one of the spaces between adjacent characters is in operative relationship with said sensing means.

* * * * *